United States Patent
Coenen

(10) Patent No.: US 8,240,736 B2
(45) Date of Patent: Aug. 14, 2012

(54) DECELERATION RESPONSIVE VEHICLE SEAT

(75) Inventor: Michel Coenen, Rotterdam (NL)

(73) Assignee: Chard Satety B.V., Rotterdam (NL)

( * ) Notice: Subject to any disclaimer, the term of this patent is extended or adjusted under 35 U.S.C. 154(b) by 158 days.

(21) Appl. No.: 12/514,854

(22) PCT Filed: Nov. 14, 2007

(86) PCT No.: PCT/NL2007/000284
§ 371 (c)(1),
(2), (4) Date: Jun. 30, 2009

(87) PCT Pub. No.: WO2008/060144
PCT Pub. Date: May 22, 2008

(65) Prior Publication Data
US 2010/0066116 A1 Mar. 18, 2010

(30) Foreign Application Priority Data

Nov. 14, 2006 (WO) ................ PCT/NL2006/000570

(51) Int. Cl.
*B60N 2/42* (2006.01)
*B60N 2/427* (2006.01)
*B60R 22/00* (2006.01)
*B60R 22/26* (2006.01)

(52) U.S. Cl. ..................... 296/65.01; 296/64; 280/801.1

(58) Field of Classification Search ................... 280/803, 280/807, 808, 801.1; 248/503.1; 296/64, 296/63, 69, 65.03; 297/344.15, 353, 312, 297/311, 336, 378.13
See application file for complete search history.

(56) References Cited

U.S. PATENT DOCUMENTS

| | | | |
|---|---|---|---|
| 3,463,543 A | 8/1969 | Zellar | |
| 4,749,231 A | 6/1988 | Cremer et al. | |
| 5,490,706 A | 2/1996 | Totani | |
| 5,492,368 A * | 2/1996 | Pywell et al. | 280/806 |
| 6,145,881 A | 11/2000 | Miller, III et al. | |
| 6,213,512 B1 * | 4/2001 | Swann et al. | 280/806 |
| 6,802,537 B1 * | 10/2004 | Tolfsen et al. | 280/801.2 |
| 2002/0067035 A1 * | 6/2002 | Ritters et al. | 280/807 |
| 2004/0051353 A1 | 3/2004 | Klukowski | |
| 2004/0113410 A1 * | 6/2004 | Morino et al. | 280/808 |
| 2005/0206205 A1 | 9/2005 | Nelson et al. | |
| 2005/0218684 A1 * | 10/2005 | Sumida et al. | 296/64 |
| 2005/0242634 A1 * | 11/2005 | Serber | 297/216.1 |

(Continued)

FOREIGN PATENT DOCUMENTS

AU 2007200954 A1 9/2007

(Continued)

*Primary Examiner* — Glenn Dayoan
*Assistant Examiner* — Sunsurraye Westbrook
(74) *Attorney, Agent, or Firm* — Hoffmann & Baron, LLP

(57) ABSTRACT

A deceleration responsive vehicle seat (20) for an occupant (9) of a vehicle, wherein the seat has a frame structure adapted to absorb the weight of the occupant and other forces exerted by said occupant on the seat. The frame structure includes a seat cushion frame assembly comprising a seat cushion frame (21), a seat cushion (22) being supported on said seat cushion frame, the frame structure further including a backrest frame assembly (25,27), a backrest cushion having an upper part (26) and a lower part (28), said backrest cushion being supported by said backrest frame assembly. The seat cushion and backrest cushion support the occupant in an upright sitting normal position. The seat further includes frame structure fixation means (2,3) adapted and arranged to fix said frame structure to the vehicle body. The seat further includes an integrated seat belt system (40,41,42,43) for said occupant.

14 Claims, 11 Drawing Sheets

U.S. PATENT DOCUMENTS

2008/0018156 A1 * 1/2008 Hammarskjold et al. . 297/354.1

FOREIGN PATENT DOCUMENTS

| DE | 1430028 | A1 | 3/1969 |
| DE | 3636912 | A1 | 5/1988 |
| DE | 102004048177 | A1 | 4/2006 |
| FR | 2101129 | | 3/1972 |
| FR | 2669283 | A1 | 5/1992 |
| FR | 2832106 | A1 | 5/2003 |
| WO | 99/67105 | | 12/1999 |

* cited by examiner

DECELERATION RESPONSIVE VEHICLE SEAT

CROSS-REFERENCE TO RELATED APPLICATIONS

This application is the National Stage of International Application No. PCT/NL2007/000284, filed Nov. 14, 2007, which claims the benefit of International Application No. PCT/NL2006/000570, filed Nov. 14, 2006, the contents of which is incorporated by reference herein.

FIELD OF THE INVENTION

The present invention relates to the field of vehicle seats. In this field a main issue is the safety of the occupant of the seat in case of a collision and in situations of sudden hard breaking

BACKGROUND OF THE INVENTION

In a common design the vehicle seat has a rigid frame structure, often with adjustable reclining angle backrest, which structure is adapted to absorb the weight of the occupant, which is seated in a normal upright position on the seat cushion while the occupant's torso is supported from behind by the backrest cushion.

In this document it is assumed that the occupant is facing forward when seated and the collision is considered to be a frontal collision. The skilled person will appreciate that the seat can be advantageous in case of a rear collision as well. Also the skilled person will appreciate that the seat could be arranged facing rearward, although a forward facing arrangement is preferred.

The term vehicle at least includes automobiles, vans, (public transport) buses, mini-buses, coaches, trucks, lorries, racecars, trains, aeroplanes.

In most automobiles a three-point seat belt is common to retain the occupant in the seat upon a collision. Commonly the three-point seat belt system has its shoulder guide member for the seat belt integrated in a pillar of the car body.

For vans, buses (including mini-buses) and coaches it is common to provide a lap belt seat belt system even though occupant safety would greatly benefit from a three-point safety belt system. However most of the presently known seat designs, especially of the passengers seats in vans, (mini-) buses and coaches, are unsuitable for integration of a three-point safety belt system. In particular the backrest and the attachment thereof to the lower part of the frame structure of the passenger seats in these vehicles is commonly unable to withstand the forces that would act on the backrest in the region of the shoulder seat belt guide in case of a collision. In Australia legislation has led to development of coach seats with integrated three-point seat belt systems, such as disclosed in patent application AU2007200954 of StyleRide Pty.

It is noted that for bus and truck drivers complex, heavy and quite expensive seats have been developed, wherein a three-point safety belt system is integrated in the seat. An example is the Recaro commercial vehicle driver seat traded under the name Profi Class Sigus. In said known seat the seat belt refractor is mounted in the upper part of the backrest.

In case of a collision these seats with integrated seat belt system are designed to maintain the occupant as good as possible in his/her normal position, and the seat cushion and backrest are generally designed to maintain their original position. Upon collision the seat belt exerts a large load on the upper part of the backrest, and it will be understood that in this known seat the backrest and its attachment to the lower part of the seat structure are designed very robust to absorb the large momentum on the backrest and its attachment.

Depending on the requirements imposed on such a seat with integrated seat belt, primarily on the g-force requirement during collision, a very robust design of the rigid frame structure of the seat will be needed in order to absorb the forces of the seat belt upon collision. This is likely to lead to a significant increase of the weight of the seat when compared to presently used passenger seat. E.g. in a bus with about 50 seats such weight increase would be highly problematic. Also the floor and/or other vehicle body element (e.g. the side wall as in a coach) on which the seats are mounted would have to be designed with extra strength, both to support the seat and to absorb the forces upon collision and/or heavy breaking, again adding to the total weight of the vehicle. For an aeroplane this issue would even be more problematic.

Another problem associated with a three-point seat belt system is the problem of "seat belt slack". Seat belt slack leads to an undesirable displacement of the occupant with respect to the seat. In a collision the occupant will accelerate forward and then be abruptly stopped by the seat belt, leading to undesirable loads on the body. Obviously the occupant could reduce this effect by tightening the seat belt himself, but it is found that most occupants do not so even in automobiles, and for public transport vehicles it is expected that even less occupants would do so.

In order to reduce seat belt slack "pre-tensioners" have been developed, often integrated with a seat belt anchoring member or seat belt lock member. Many pretensioners are pyrotechnic devices, which are triggered upon an actual collision, upon command of a suitable sensor, and then tension the seat belt. Also a pretensioning seat belt retractor is known, which is also governed by a suitable sensor, e.g. based upon the deceleration caused by the braking of the vehicle by the driver. For application in buses etc, with many seats such pretensioners are likely to be too expensive, both in terms of acquisition and maintenance.

SUMMARY OF THE INVENTION

An object of the present invention is to provide an improved vehicle seat.

Preferably said seat is equipped with a three-point seat belt system.

Another object of the invention is to provide a vehicle seat that includes a frame structure offer a deceleration responsive mobile support for the occupant, so that upon a deceleration as commonly takes place before collision and/or during the initial phase of collision the occupant moves towards a crash position.

Yet another object of the invention is to provide a vehicle seat that deals with seat belt slack.

Yet another object of the invention is to provide a vehicle seat that lessens the occurrence and/or severity of whiplash.

Yet another object of the invention is to provide a vehicle seat that attains increased occupant safety with a relative low weight seat design.

Yet another object of the invention is to provide a vehicle seat that provides enhance safety of passengers in a vehicle wherein seats are placed one behind another and/or in a row next to one another, as in a bus, minivan or coach.

Yet another object of the invention is to provide a vehicle seat that can be placed on a vehicle floor, e.g. a bus or coach floor, with interlinking of the seats to reduce forces acting on the floor.

One or more of the above objects are achieved by a deceleration responsive vehicle seats according to the present invention.

It is known that most collisions take place after the driver has attempted to forcefully brake and reduce the vehicle speed, even when for a very short period. In common seat designs the occupant as a result of the vehicle deceleration has already moved forward with respect to stationary seat cushion and backrest. The known "pretensioners" commonly are only effective to reduce any remaining seat belt slack.

The present invention envisages that both the seat cushion and the backrest move to a favourable crash position under relevant deceleration conditions. For instance for the occupant this means that the backrest cushion (or at least the upper part thereof) follows his torso upon forward motion of the occupant, which is e.g. favourable upon "rebound" of the occupant, as his back will then be "caught" in an early stage by the backrest.

Preferably the backrest frame assembly includes a head rest which extends at the back of the head of the occupant. It is envisaged that this is favourable for reducing (the effects) of whiplash.

As will be explained below in more detail the "mobility" of the parts of the frame structure supporting the seat cushion and the backrest cushion offers many potentially attractive options.

For instance said mobility can be used to obtain a reduction of seat belt slack during the forward motion.

Also the mobility can be used to bring parts of the frame structure into or at least towards a desired crash position, primarily with the aim to increase occupants safety in a collision. In general the "mobility" provides both time and a motion path for the occupants body, which allows to bring the body in a more favourable position in collision conditions as well as provides the opportunity to absorb energy in a more gradual manner.

It is preferred to design the seat such that upon relevant deceleration the hip region or lower portion of the torso of the occupant moves forward along with the seat cushion, preferably with no or minimal slippage of the occupant over the seat cushion as may be enhanced by the inclination effect described below taking place simultaneously. This forward motion of the lower portion of the torso has the advantageous effect that forward tilt motion of the torso, and in particular of the head, is reduced compared to collision with an ordinary seat. In said seat, with seat belt, the head is subjected to a vehement forward tilting upon collision, thereby abruptly bending the neck, with an equally vehement backwards rebound of the head. As the heavy part of the torso is now allowed to move forward, the torso and head forward tilting motion is less severe, thereby reducing loads on the seat belt (and thus on the body as well as the seat structure) and also reducing loads on the neck of the occupant.

In a preferred embodiment the frame structure is such that upon pre-collision braking and/or collision induced deceleration the backrest cushion (or at least an upper part thereof) moves forward over a greater distance than the seat cushion. This allows to "let the backrest follow the back of the occupant" as the torso of the occupant is likely to tilt forward upon vehement braking of the vehicle or collision. This is enhanced in the presence of a headrest which will then follow the head of the occupant.

In a further preferred embodiment the frame structure is such that upon pre-collision braking and/or collision induced deceleration the backrest cushion (or at least an upper part thereof) is tilted forward, primarily so that this (part of the) backrest follows the back of the forward tilting occupant. This is enhanced in the presence of a headrest which will then follow the head of the occupant.

In a further preferred embodiment the frame structure is such that pre-collision braking and/or collision induced deceleration the seat cushion frame—in addition to its forward motion—is subjected to a tilting so as to cause a relative raise of a forward portion of the seat cushion frame relative to a rear portion of the seat cushion frame. This feature allows bringing the occupant in an even more favourable crash position. In general this causes the upper legs of the occupant to rest on a "more inclined" seat cushion than in the normal position for driving, the forward sliding of the body with respect to the seat cushion being counteracted as well a greater part of the occupants inertial forces being absorbed by the seat cushion frame assembly. Depending on the dimensions of the frame structure this "inclination effect" can fully counteract any submarining of the occupant, so the occupant does not slide over the seat cushion, as well as significantly reduce the loads imposed by the seat belt on the occupant. The latter effect is highly relevant as loads imposed on the body by the seat belt often result in serious injury of the occupant.

In a possible embodiment of the seat this "inclination effect" is (partly) caused by a lowering of the rear portion of the seat cushion frame. As is preferred the seat belt effectively is attached to this seat cushion frame, preferably to the rear portion thereof, so that the occupants pelvic region is effectively pulled down along with the descending rear portion of the seat cushion frame. This may produce the positive effect that the head of the occupant is brought in a "lower orbit" and thus effectively moved away from the steering wheel, windshield and/or windshield header bar of a vehicle. For taller occupants this can have very beneficial effects on potential head injuries during a collision.

In some vehicles, such as sports cars, such a lowering of the rear portion may be impractical due to the low height of the seat cushion above the vehicle body floor. In those circumstances the inclination effect of the seat cushion frame could be created by raising the front portion of the seat cushion frame only. It is noted that the prior art discloses sensor-controlled actuators to effect a tilting of the front portion of the seat cushion frame in case of a pre-collision deceleration or collision.

The "front portion only" preferred embodiment of the invention is based on the fact that the inclination effect is caused by a suitable mechanical design of the frame structure itself, and is done without such an actuator, as they are costly (especially in a bus or coach) and need maintenance/supervision.

In an arrangement with seat one behind another, as in many buses and coaches, the invention offers the possibility to reduce the likelihood that an occupant hits the backrest of the seat in front of him, as said backrest will have moved forward as well (possibly even when the seat is empty). It can be envisaged to provide a mechanical coupling between seats of this type, so that that a seat with no occupant will be urged towards the crash position as well. This measure can also be applied in situations wherein seats are placed next to one another.

In a highly preferred embodiment of the inventive seat it is envisaged that the frame structure is such that said forward motion to crash position is induced solely by inertia of the mass of the occupant and of the relevant parts of the seat. This allows to dispense with any actuators in the seat that would be provided to effect the desired motion of the seat cushion and backrest (at least upper part thereof) in case of a pre-collision deceleration. The relevant parts of the frame structure basically "follow" the occupant, which is seated on the seat cushion and also "attached to the seat" with the safety belt, and arrive at the desired crash position.

In a practical embodiment the mobility provided by the frame structure is such that the relevant parts are responsive to even small decelerations, so that said motion towards the crash position already starts even in braking situation where no collision is envisaged by the driver. Upon termination of the braking action the frame structure will then return the seat to its normal position, e.g. based on gravity.

In another practical embodiment the seat further includes blocking means that are construed and arranged to block said seat in its normal position and allow for motion towards the crash position upon "the presence of one or more conditions", e.g. an inertia induced increase of a load on said blocking means above a predetermined load level, or a sensing of the deceleration, said deceleration increasing above a predetermined deceleration rate, or any other sensing e.g. of a collision risk (by radar or other distance sensing device), sudden vehicle movements (steering), etc. Also it can be envisaged that the seat is blocked in its normal position when the vehicle travels on an incline.

For instance the blocking means could a spring loaded detent engaging a part of the frame structure, retaining said frame structure stationary when in normal position, and releasing said frame structure e.g. when a threshold load on the detent is surpassed or when a sensor associated with the detent senses a predetermined deceleration (e.g. as used in seat belt retractors to cause the blocking of the retractor).

Although not preferred the present invention also envisages that the seat includes an actuator adapted to force said seat to its crash position upon a command to said actuator, e.g. based on a sensing of the deceleration.

As mentioned before the invention envisages not that the relevant seat part not only move forward to said crash position, but also that the frame structure allows for returning of said seat cushion and backrest cushion to their normal position responsive to reduction or termination of deceleration.

In particular it is envisaged that in many cases of vehemently braking no collision will occur and the braking action is terminated by the driver. The seat will then return to its normal position.

In a preferred embodiment the frame structure is such that said "return motion" is based primarily on gravity. This is possible when the frame structure causes the centre of gravity of the relevant seat parts and occupant to be raised during forward motion towards the crash position, this centre then striving to return to its lower position when the deceleration is terminated or reduced.

The possibility to "return to its normal position" is also highly advantageous in view of absorption of the rebound of the seat and occupant resulting from the collision. This rebound causes the back of the occupant to be forced against the backrest and then the backrest can "move along" with the occupant to absorb the rebound.

It can be envisaged to include in the seat retardation or energy absorption means that are effective in "return direction" and serve to reduce the speed of the seat (and occupant) in said return direction (so upon rebound from the collision). Such retardation or energy absorption means could e.g. include an oil damper or other damper (e.g. friction based) (preferably acting only in rebound direction), a sacrificial member in the seat structure which is plastically deformed upon return motion of the seat, etc. The retardation or energy absorption means could e.g. include a further belt with some sort of seat belt retractor mounted on a sacrificial base (on the vehicle floor). Upon collision the refractor shortens the belt upon forward motion of the seat, land locks upon sudden (collision induced) return motion. The retractor is the moved along with the belt while the sacrificial base gives way and so retards the seat. Should no collision occur, there will be no sudden return motion and the retractor will allow for re-extension of the belt.

In a preferred embodiment the integrated seat belt system furthermore includes one or more intermediate seat belt guide members provided in said frame structure at one or more locations spaced from each other and from the shoulder guide member and the retractor or other end terminal of the seat belt, each of said seat belt guide members allowing to guide said seat belt thereby defining a path for said seat belt between said retractor and said seat belt shoulder guide member. This e.g. allows providing the retractor on the frame structure in the area under the seat cushion instead of in the backrest as in the mentioned prior art Recaro seat.

In a highly advantageous embodiment the frame structure is such that upon pre-collision braking and/or collision induced deceleration the spatial orientation of said retractor, said one or more intermediate seat belt guides and said shoulder seat belt guide changes with respect to said spatial orientation in normal position thereby causing a lengthening of the path of the seat belt between the retractor and the shoulder guide member, preferably of at least 10 centimeters when said seat is in crash position, preferably between 10 and 50 centimeters, most preferably between 10 and 30 centimeters. This concept is based on the insight that the "mobile support" provided now by the frame structure can be put to use to deal with the problem of seat belt slack. In a frame structure providing the desired mobility towards the crash position the skilled person will be able to position these parts such that the desired lengthening occurs. This e.g. allows—as is preferred—to dispense with additional seat belt tensioning devices in the seat other than the retractor, which is then preferably embodied without deceleration or collision sensor controlled pretensioning device.

In a preferred embodiment said one or more intermediate seat belt guide members each included a curved guide face for the seat belt mounted stationary on the frame structure. The seat belt guide members can e.g. be a metallic rod or tube integrated in member of the frame along which the seat belt can slide.

In a practical embodiment the frame structure includes a first and second frame member each provided with at least one intermediate seat belt guide member, said first and second frame member being subjected to a change of mutual spatial orientation during motion of the seat from said normal position to the crash position thereby causing a lengthening of the path for the seat belt.

In an advantageous practical embodiment the first member is associated with the seat cushion frame assembly and the second member with the backrest frame assembly. This is e.g. practical when the (upper part of) the backrest is designed to move further forward than the seat cushion, thus requiring frame members in each assembly having different "orbits" during said forward motion.

In a practical embodiment to obtain a significant lengthening of the seat belt path a pair of intermediate seat belt guide members is arranged on one of the first and second frame members and another central intermediate seat belt guide member on the other of the first and second frame members, so as to form an open loop in said seat belt around said intermediate guide members, said frame members being construed and arranged to move said central intermediate guide member away from said pair upon motion to the crash position thereby lengthening the path for the seat belt.

The guidance of the seat belt along one or more intermediate guide members within the frame structure also allows the designer to "absorb forces within the frame structure" as the structure is loaded by high forces during collision. The seat belt then acts as a "tensile force transmitting element" within the frame structure.

The lengthening of the path of the seat belt as mentioned above also allows the seat belt to effect a "retardation" on the forward motion of the seat to its crash position. This is in particular obtained when—as is preferred—said one or more intermediate seat belt guide members each included a curved guide face for the seat belt mounted stationary on the frame structure so as to frictionally guide the seat belt there along when contacted by said seat belt.

The "frictional engagement" could be undesirable in view of the ease for the occupant to apply the seat belt and the retraction of the seat belt when the belt is released from its lock by the occupant. For this and other purposes it can be envisaged that the frame structure and said one or more intermediate seat belt guides therein are such that in normal position of the seat some of the intermediate seat belt guides are spaced from the seat belt, and wherein upon motion towards the crash position said one or more "normally spaced" intermediate seat belt guides come into contact with said seat belt.

The invention also relates to a deceleration responsive vehicle seat for an occupant of a vehicle, said seat having a frame structure adapted to support the occupant and to absorb the weight of the occupant and other forces exerted by said occupant on the seat, said frame structure including a seat cushion frame assembly, said seat cushion frame assembly comprising a seat cushion frame and a seat cushion being supported by said seat cushion frame, said frame structure further including a backrest frame assembly, said backrest frame assembly comprising a backrest frame and a backrest cushion being supported by said backrest frame, said seat allowing to support said occupant in an upright sitting normal position, said seat further including frame structure fixation means adapted and arranged to fix said frame structure to the vehicle body, wherein the frame structure fixation means provide mobile attachment of the seat cushion frame assembly and the backrest frame assembly to the vehicle body, preferably pivotal attachment, and wherein the seat cushion frame assembly and backrest frame assembly are linked to another in a mobile manner, said seat further including a seat belt system with a seat belt for said occupant, wherein the frame structure is such that—upon pre-collision braking and/or collision induced deceleration—inertial forces result in the seat cushion frame assembly performing a motion so as to move the seat cushion forward and simultaneously the backrest cushion tilting forward, the seat cushion frame assembly preferably also causing a relative inclination of the seat cushion frame so as to cause a forward portion of the seat cushion frame to be raised relative to a rear portion thereof.

The invention also relates to a deceleration responsive vehicle seat for an occupant of a vehicle, said seat having a frame structure adapted to support the occupant and to absorb the weight of the occupant and other forces exerted by said occupant on the seat, said frame structure including a seat cushion frame assembly, said seat cushion frame assembly comprising a seat cushion frame and a seat cushion being supported by said seat cushion frame, said frame structure further including a backrest frame assembly, said backrest frame assembly comprising a backrest frame and a backrest cushion being supported by said backrest frame, said seat allowing to support said occupant in an upright sitting normal position, said seat further including frame structure fixation means adapted and arranged to fix said frame structure to the vehicle body, wherein the frame structure fixation means provide mobile attachment of the seat cushion frame assembly and the backrest frame assembly to the vehicle body, preferably pivotal attachment, and wherein the seat cushion frame assembly and backrest frame assembly are linked to another in a mobile manner, said seat further including a seat belt system with a seat belt for said occupant, which seat belt system further includes at least:—a seat belt end terminal, preferably a retractor, mounted on said frame structure or a seat belt end terminal, preferably a retractor, to be mounted on the vehicle body,—a seat belt shoulder guide member mounted on said backrest frame assembly,—additional seat belt members, e.g. an anchoring member and a seat belt lock member, mounted on said frame structure on opposite sides of the seat cushion, wherein said seat belt system furthermore includes one or more intermediate seat belt guide members provided in said frame structure at one or more locations spaced from each other and from the shoulder guide member and the end terminal, each of said intermediate seat belt guide members being adapted to guide said seat belt thereby defining a path for said seat belt between said end terminal and said seat belt shoulder guide member, and wherein the frame structure is such that upon pre-collision braking and/or collision induced deceleration the spatial orientation of said end terminal, one or more intermediate seat belt guides and said shoulder seat belt guide changes with respect to said spatial orientation in normal position thereby causing a lengthening of the path of the seat belt between the end terminal and the shoulder guide member, preferably of at least 10 centimeters, more preferably between 10 and 50 centimeters, most preferable between 10 and 30 centimeters.

A further aspect of the invention relates to a vehicle seat having a backrest frame and a three-point seat belt system, wherein the shoulder guide for the seat belt is part of the backrest frame and is placed at an angle with respect to the horizontal, the backrest frame further including an inner seat belt guide adjacent to the shoulder guide, which inner seat belt guide also is a part of the backrest frame and is also placed at an inclined orientation, the angle between the inner seat belt guide and the adjacent shoulder guide being less than 90 degrees, the seat belt arriving at the inner seat belt guide from below, then passing from the front to the back of said inner seat belt guide over the guide and then towards the back of the shoulder guide from where the seat belt passes over the shoulder guide to the front of the backrest frame so that it may the then pass over the torso of the occupant, preferably the effective width of the shoulder guide being at least twice the width of the seat belt.

The inclined orientation of the shoulder guide has the effect that the position of the seat belt will automatically adjust to the height of the occupant (in particular the position of the shoulder of the occupant). This effect is very advantages in buses etc, wherein nowadays no provisions are present to adjust the shoulder guide. Also as the shoulder guide includes no moving parts, its design is cheap and incorporation in the backrest simple.

BRIEF DESCRIPTION OF THE DRAWINGS:

Further preferred embodiments of the inventions are described in the appended claims and will now be explained in more detail with reference to the drawings. In the drawings:

DETAILED DESCRIPTION OF PREFERRED EMBODIMENTS

Figure 1:
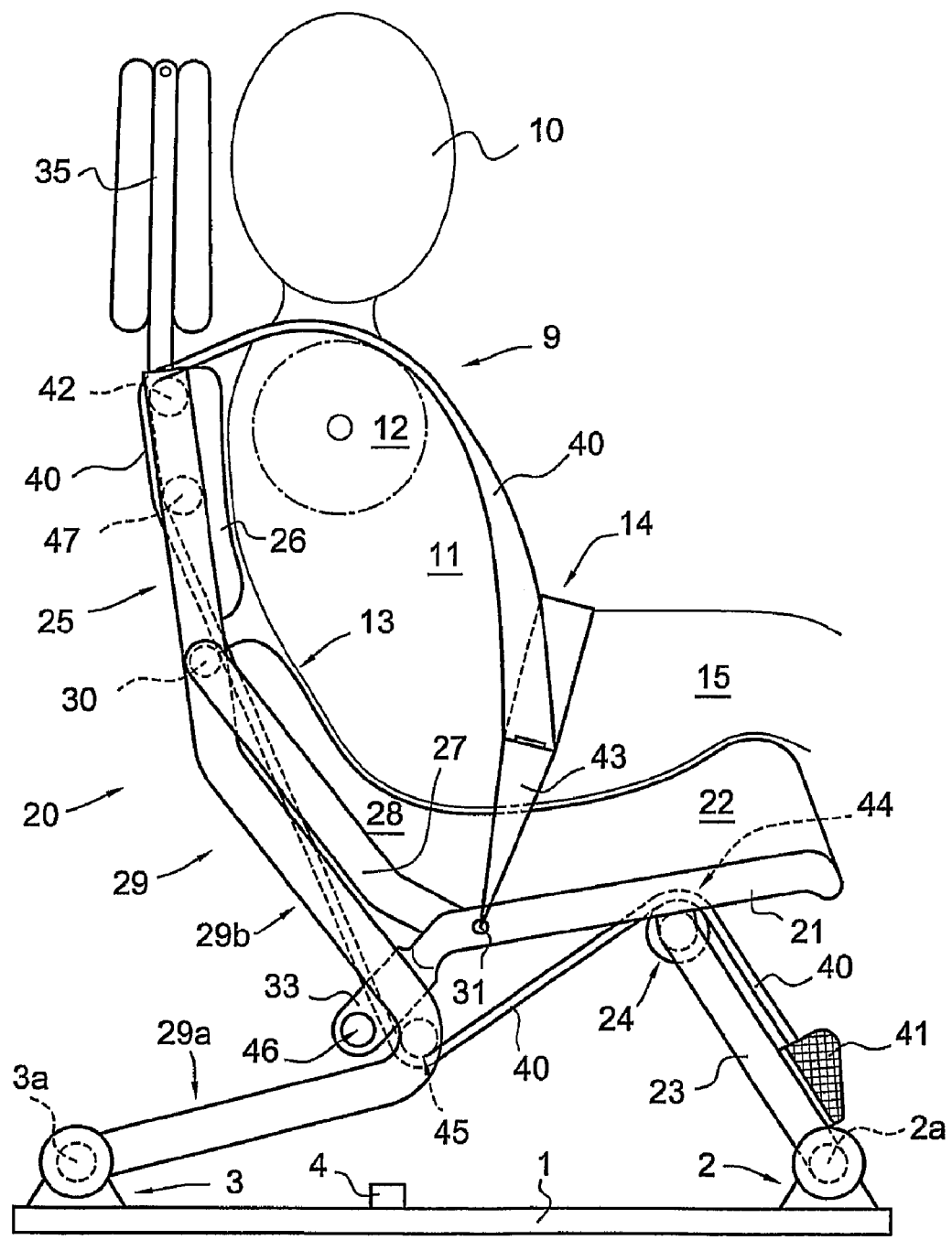
FIG. 1 shows diagrammatically a first example of a seat according to the invention when in normal position, FIG. 2 the seat of FIG. 1 in crash position.

The FIGS. 1-10 show a section of a vehicle floor 1, e.g. a floor of a van, (mini-) bus or coach on which the inventive seat is fixed. It will be appreciated from this document that said seat is advantageous as passenger seat in such vehicles, in particular in vehicles wherein multiple rows of one or more seat are situated one behind another. Other applications of the inventive seat, e.g. in a car and/or as driver seat, or even in aeroplanes are also contemplated. The seat could also be installed in a sport car.

On the floor 1 a forward and rearward pivotal connector 2, 3 is fastened belonging to the seat shown. It is envisaged that in a vehicle with multiple rows of one or more seats behind one another the forward pivotal connector of a seat can also function as the rearward pivotal connector of the seat in front of said one seat, e.g. by said pivotal connector having a pivot shaft 2a, 3a common for both seats.

In the FIGS. 1-10 the occupant 9 is shown schematically with a head 10, torso 11 with shoulder 12, back 13, lap 14 and legs 15. It is envisaged that the seats are designed to accommodate adult occupants, but a specific child version could be construed as well for certain purposes.

Below the seat 20 shown in FIGS. 1, 2 will be discussed in detail along with its behaviour during pre-collision deceleration of the vehicle. Based on said explanation the skilled person will readily understand the seats shown in the other figures and for said reason these FIGS. 3-10 will be accompanied with a short description only.

The seat 20 is a deceleration responsive vehicle seat for the occupant 9 of the vehicle. As in general the seat 20 has a frame structure adapted to absorb the weight of the occupant 9 and other forces exerted by said occupant on the seat as will be explained in detail below.

The frame structure here generally is composed of two assemblies which are linked together namely a seat cushion frame assembly and a backrest frame assembly.

In general the frame elements of the frame structure can be made of steel, but other materials, e.g. suitable plastic materials are also envisaged.

The seat cushion frame assembly includes a seat cushion frame 21 and a seat cushion 22 is supported on said seat cushion frame 21. As preferred the seat cushion frame 21 extends under at least a major part of the cushion 22.

The seat cushion frame assembly here further includes a pivotal frame member 23 which is at its lower end connected to pivotal connector 2 and at its upper end pivotally, by pivotal connector 24, connected to the seat cushion frame member 21 upon which the seat cushion 22 is supported.

The backrest frame assembly here includes an upper backrest frame member 25 supporting an upper part 26 of the backrest cushion, and a lower backrest frame member 27 supporting a lower part 28 of the backrest cushion.

It is noted that the seat cushion and/or backrest cushion and/or headrest cushion can have many different designs with or even without resilient properties for the occupant. For instance the cushion can be a relatively thick resilient product (such as now commonly present in automobiles), a relatively thin and quite stiff thin cushion (as often found in public transport vehicle, e.g. vandal proof), a thin web (e.g. a plastic mesh), a perforated metal plate element, etc.

As can be seen in the figures the upper back rest frame member 25 is integral with a pivotal frame member 29 which is connected at its lower end to rearward pivotal connector 3.

In detail the integrally built upper back rest member 25 and pivotal frame member 29 includes—starting from the rearward pivotal connector 3—a forwardly directed section 29a (as preferred in a upward inclined orientation with respect to the floor 1) followed by a angled section 29b directed upward and rearward, which is at its upper end integral with the lower end of the member 25.

Figure 2:
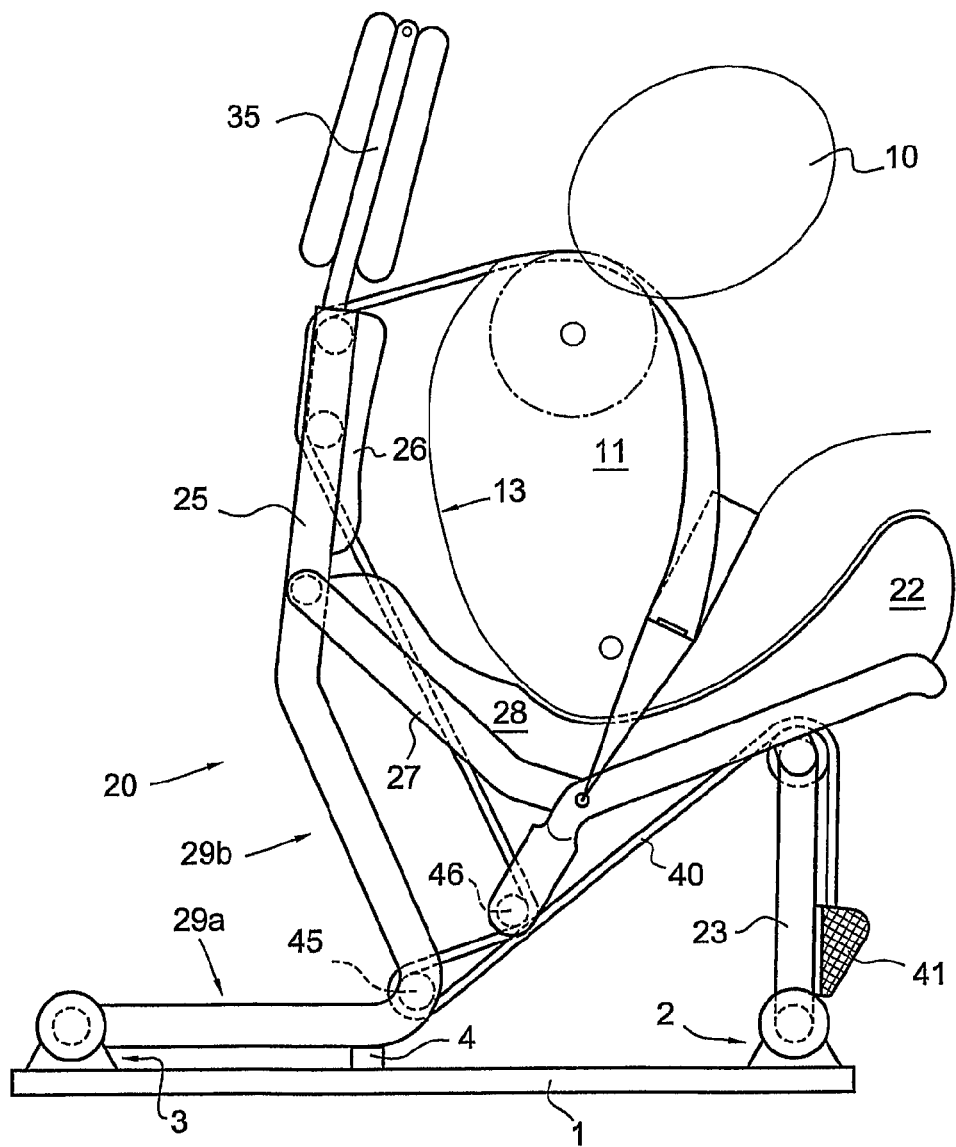

The free angle between the section 29a and the floor 1 allows the member 29 to pivot forward, as can be seen in FIG. 2.

The FIGS. 1,2 also show that the lower backrest frame member 27 is at its upper end pivotally connected, here by pivot connector 30, to the upper backrest member 25 (here about half the height of the back of the occupant). Also it can be seen that the lower end of the lower backrest frame member 27 is at pivot connector 31 pivotally connected to the rear portion of the seat cushion frame member 21.

It is shown here that the seat cushion 22 is integral with the lower backrest cushion 28, whereas the upper backrest cushion 26 is a separate part. It will be appreciated that other designs, e.g. with one integral cushion forming both seat cushion as well as lower and upper backrest cushion are also possibly, just as a further division of the cushion into separate parts.

In this example the seat cushion frame member 21 includes an integral rearward extension 33 at its rearward end.

In the normal position of FIG. 1 of the seat 20 the lower backrest frame member 27 bears against the section 29b, thereby maintaining the frame structure in said position under the weight of the seated occupant in his upright sitting normal position.

The seat 20 further includes an integrated three-point seat belt system for the occupant 9. It is noted that a four-point seat belt system or even five point system could also be employed in the seat to offer an even enhanced securing of the occupant in the seat by the seat belt system. As mentioned in a lesser preferred design the seat could include even a simple lap belt seat system and still offer relevant improvements and beneficial effects upon a collision compared to prior art seats with a lap belt system.

This seat belt system here includes a seat belt 40 and a seat belt retractor 41, here mounted below the seat cushion 22 on the pivotal frame member 23.

The system further includes a seat belt shoulder guide member 42 mounted on the upper backrest frame member 25 so as to guide the seat belt at said location over the shoulder of the occupant 9.

The three-point seat belt system further includes a seat belt anchoring member (not visible here) and a seat belt lock member 43 mounted on the frame structure on opposite sides of the seat cushion 22. As such a lap part of the seat belt extends across the lap or pelvic region 14 of the occupant and a shoulder part extends somewhat diagonally from the shoulder guide 42 across the front of the torso 11 to the lock member 43.

The seat 20 also includes a headrest 35 with a head rest frame and headrest cushion. The headrest 35 here is mounted on the upper end of the integrated frame members 29, 25 so as to extend at the back of the head 10.

The seat belt 40 follows a path between the retractor 41 and the guide member 42 defined by several intermediate seat belt guide members, here 44, 45, 46, 47, provided in the frame structure at more locations spaced from each other and from the shoulder guide member 42 and the retractor 41.

The guide member 45 is arranged on the pivotal frame member 29, here close to the angle therein, and guide member 46 is arranged on extension 33 of the seat cushion frame member 21.

As can be seen in the FIGS. 1, 2 the frame structure is thus here essentially composed of pivotally interconnected frame members supporting the cushion parts and also pivotally connected to the vehicle floor 1 (and/or other parts of the vehicle depending on the vehicle design).

The FIG. 2 shows the seat 20 with the occupant 9 when in crash position. This position is reached as a result of pre-collision deceleration of the vehicle, commonly by vehement braking of the vehicle by the driver who foresees a collision. In practice such braking can occur only a very short time before the actual collision takes place, but in a suitable design (as shown here) the seat will already respond to said deceleration. It will need no explanation that upon impact far greater decelerations are experienced and the seat would respond also when no prior pre-collision braking had taken place. Nonetheless many collisions are preceded by vehement braking and the inventive seat aims to "profit" from said deceleration by bringing the seat and occupant in a crash position favourable for the occupant (and also for the occupant of a seat behind when present). It is noted, as will be apparent from this document, that also the motion of the occupant from his/hers original normal seated position towards the crash position (and even the rebound motion when applicable) is highly beneficial for the occupant, mainly in view of forces on the body and spatial motions of portions of the occupants body in crash conditions.

The FIG. 2 shows that both the frame member 25/29 of the backrest frame assembly and the pivotal frame member 23 of the seat cushion frame assembly have pivoted forward. Here an abutment 4 on the floor engaging member 29 defines an end position for the member 29.

The pivoting motion of these frame members 25/29 and 23 bring about numerous effects.

It can be seen that the seat cushion 22 and backrest cushion parts 26, 28 have moved in generally forward direction to the crash position when compared to the normal position of FIG. 1. As such they have "followed" the motion the occupant, whose body wanted to slide forward over the seat cushion and whose torso 11 started to tilt forward away from the backrest (e.g. due to seat belt slack). Thus the frame structure acted in response to the pre-collision braking of the vehicle induced solely by the inertia of the occupant and the relevant seat parts (it can be envisaged that an empty seat in a bus or the like would act in similar manner).

When comparing FIG. 1 and FIG. 2 it can be observed that upon pre-collision braking and/or collision induced deceleration the backrest cushion, in particular the upper part 26, moves forward over a greater distance than the seat cushion 22 so as to allow the upper part 26 to stay "closer behind" the back of the occupant.

The seat 20 here is such that upon motion to said crash position the upper backrest frame member pivots about the pivotal connector 3 on the floor and thus "follows" the angular motion of forward tilting occupants torso 11.

In all the seat 20 has the effect that the upper backrest cushion 26 (and here also the head rest 35) follows the motion of the torso (and of the head) of the occupant. As explained this ensures a favourable crash position of the occupant upon impact and also is favourable in view of whiplash commonly resulting from the rebound experienced shortly after impact. The head will still tilt forward with respect to the torso, but the rebound will be less harmful as the upper backrest cushion and the headrest are "close behind" these body portion upon rebound.

The FIGS. 1, 2 also shown that the frame structure is such that pre-collision braking and/or collision induced deceleration the seat cushion 22—here as preferred in addition to its forward motion—is subjected to a tilting so as to raise a forward portion of the seat cushion frame member 21 relative to a rear portion of the seat cushion frame member 21. As explained this contributes to the occupant not sliding over the seat cushion or the "submarining effect" as it is known in the art. Also the front-up tilted orientation of the member 21 allows to transfer as significant part of the "forward directed load" of the occupant onto the member 23 thereby reducing the load on the seat belt 40.

A further, highly advantageous effect of the seat 20 upon motion to the crash position is the reduction of seat belt slack, without any sensor-controlled pretensioners or any other active device such as a seat belt tensioner with active control coupled to a collision/danger sensing system. Of course the inventive seat may be combined with such pretensioners or system.

As can be seen when comparing FIG. 2 to FIG. 1 the path for the seat belt 40 between the retractor 41 and the shoulder guide 42 is significantly greater in FIG. 2 than in FIG. 1. It will be appreciated that said path has lengthened gradually as a result of and during said motion of the frame structure to the crash position.

In fact the frame structure and the arrangement of the intermediate seat belt guides thereon is such that upon pre-collision braking and/or collision induced deceleration the spatial orientation of said retractor 41, intermediate seat belt guides 44-47 and said shoulder seat belt guide 42 changes with respect to said spatial orientation in normal position thereby causing a lengthening of the path of the seat belt between the retractor 41 and the shoulder guide member 42. Preferably said path is lengthened by at least 10 centimeters, more preferably between 10 and 50 centimeters, most preferable between 10 and 30 centimeters.

In a less desirable, yet low cost variant which is not shown the retractor 41 is replaced by an end terminal having no retraction capabilities, so that the end of the seat belt is fixed here. This is e.g. possible if other length adjusting arrangements are provided in the seat belt (e.g. as were common in the time prior to the development of seat belt retractors).

In this example the guides 42-47 all include curved guide face for the seat belt, and said guides 42-47 are mounted stationary on the frame structure.

For seat belt guide 46 it can be observed in FIG. 1 that in normal position of the seat this guide is spaced from the seat belt 40, and upon motion to the crash position said "normally spaced" intermediate seat belt guide 46 comes into contact with said seat belt.

The seat belt 40 here also serves to "retard" or "brake" the frame structure when moving to its forward crash position. Also stretching of the seat belt here act as an internal tension-transmitting member in then frame structure which could be favourable for the load to be absorbed by other members of the frame and possibly allow for reduction of their robustness and thus allow to save weight.

It may be desired that the seat belt guides not only lengthen the path for the seat belt but also frictionally engage the seat belt when contacted by said seat belt. However, to keep loads on the seat belt acceptable, and avoid local overloading, the relevant seat belt guide may also be low friction design and/or include rollers along which the seat belt is passed.

In FIGS. 1 and 2 it can be observed that upon motion of the seat from said normal position towards said crash position the upper and lower backrest frame members 25, 37 include a gradually decreasing angle between them, so that the backrest resembles somewhat a cupped hand which is also favourable for the receipt of the occupant upon rebound from the collision impact.

A rebound is commonly observed in collisions and such rebound is considered to cause or increase whiplash and similar injuries.

The seat 20—as is preferred—is designed to allow returning of the seat cushion 22 and backrest cushions 26, 28 (and the associated frame structure) to their normal position responsive to rebound of the seat and occupant resulting from the collision.

In fact the rebounding occupant is "caught" by the backrest (which could be cupped as explained) and the backrest and the seat cushion are able to move along with the rearwardly thrown occupant. So the rebounding occupant is supported by the seat during most of the rebound displacement reducing injury and/or severity thereof.

It will also be appreciated that many vehement braking actions of a vehicle driver will not end in a collision, the driver then releasing the brake.

The seat 20 has a frame structure that allows for returning of said seat cushion and backrest cushion to their normal position responsive to reduction or termination of deceleration. In particular the frame structure is adapted to allow for returning of said seat cushion and backrest cushion from the crash position to their normal position responsive to reduction or termination of deceleration based on gravity acting on the seat and occupant as the skilled person will appreciate from the drawings.

In a not shown alternative the seat 20 could include blocking means that are construed and arranged to block said seat 20 in its normal position and allow for motion to the crash position upon one or more conditions being detected, e.g. an inertia induced increase of a load on said blocking means above a predetermined load level, or a sensing of the deceleration, said deceleration increasing above a predetermined deceleration.

In FIGS. 3-10 similar parts have been denoted with the same reference numerals.

Figure 3:
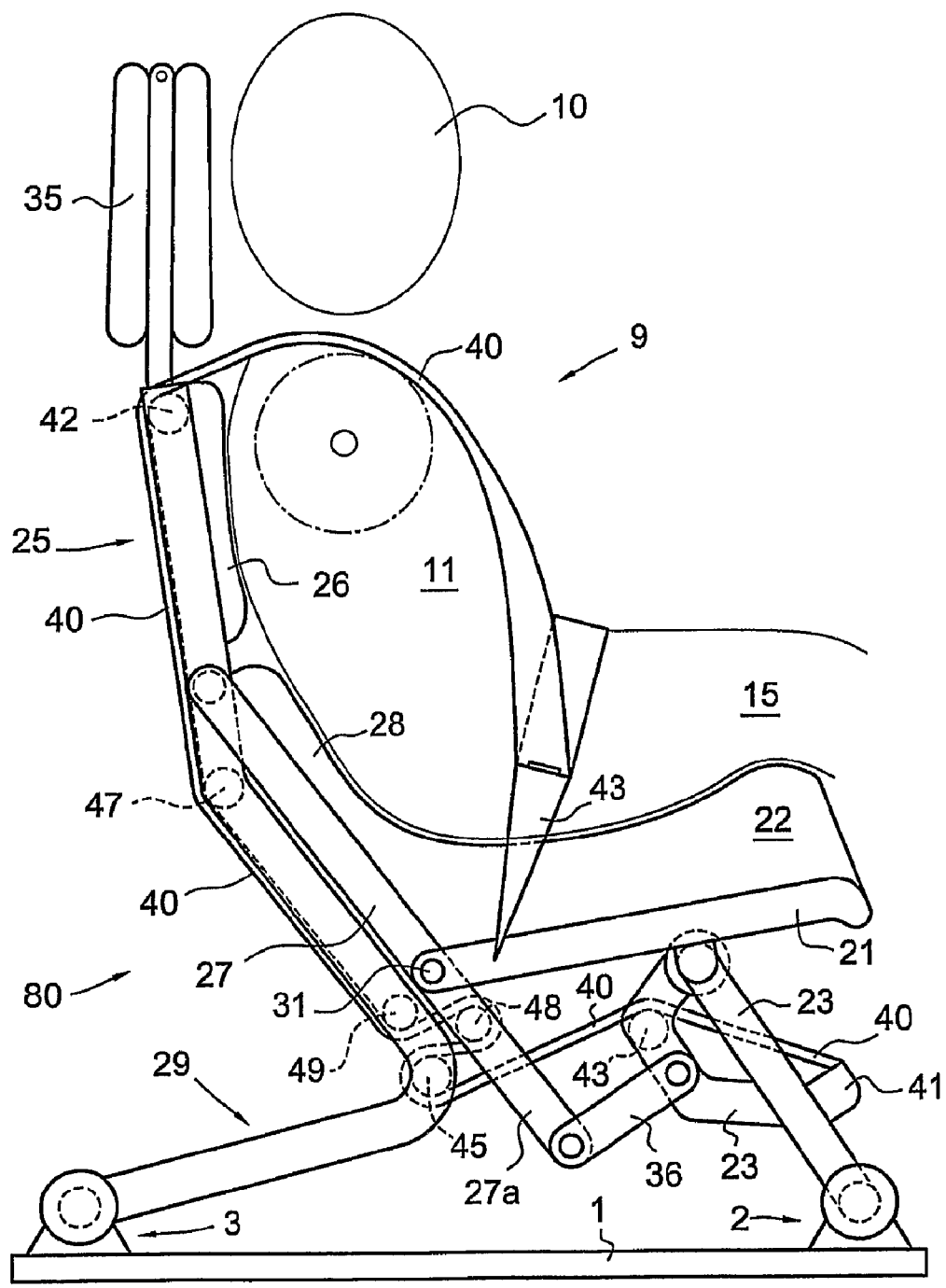
FIG. 3 shows diagrammatically a second example of a seat according to the invention when in normal position, FIG. 4 the seat of FIG. 3 in crash position.
Figure 4:
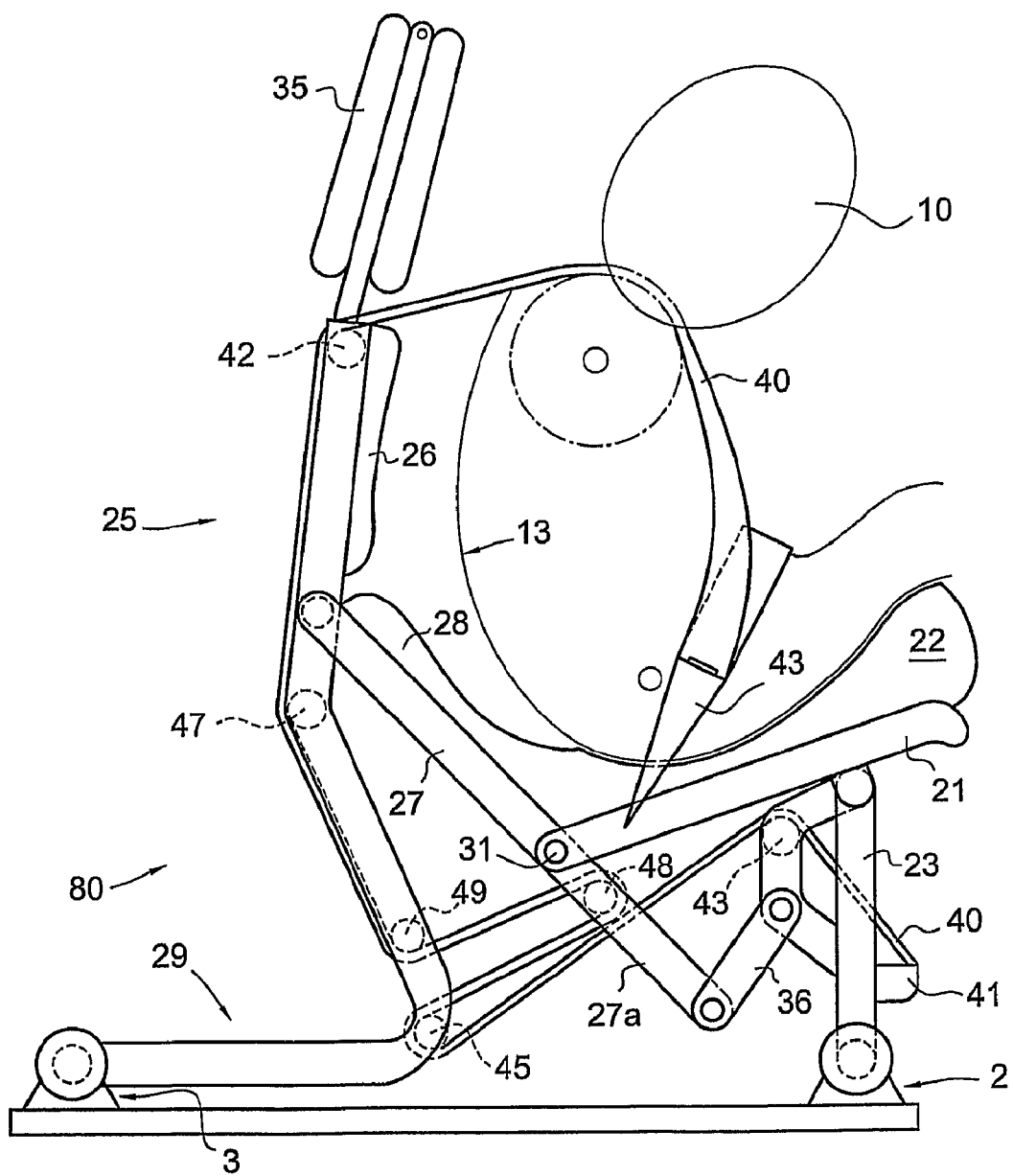
Figure 5:
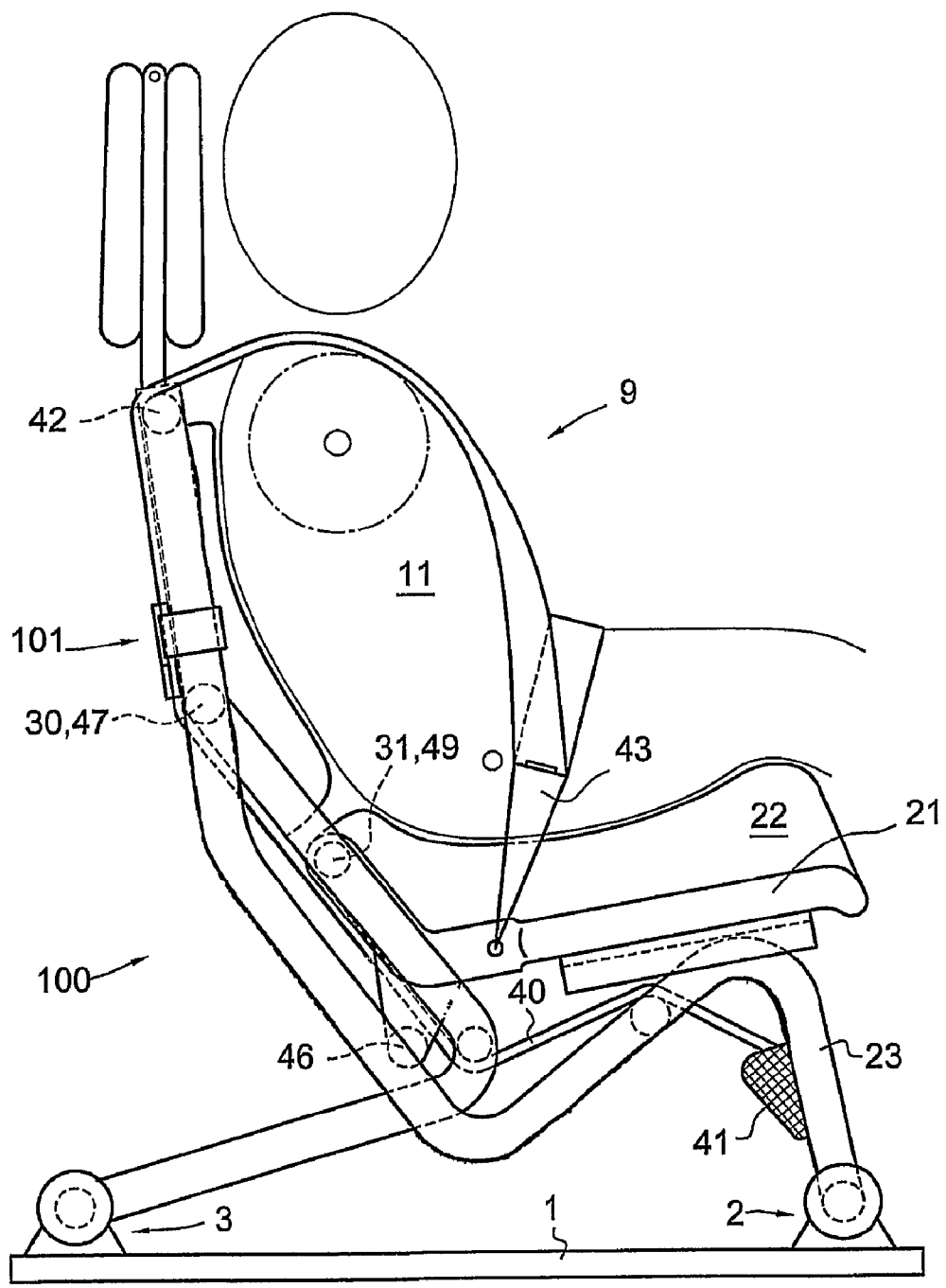
FIG. 5 shows diagrammatically a third example of a seat according to the invention when in normal position, FIG. 6 the seat of FIG. 5 in crash position.
Figure 6:
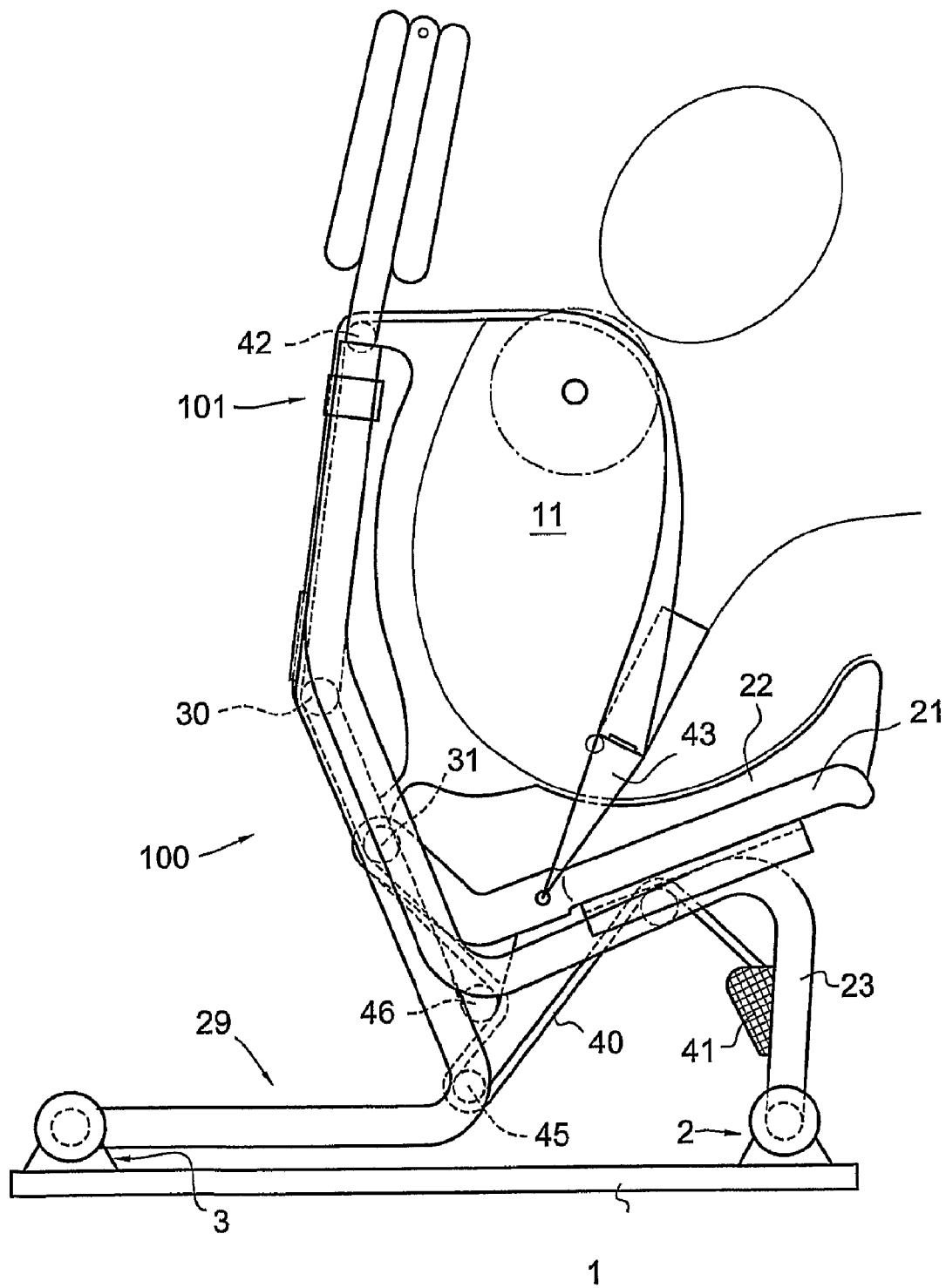

In FIGS. 3, 4 seat 80 has a lower backrest frame member 27 which includes a lower extension 27a below pivot connector 31. On said extension a further intermediate and central seat belt guide member 48 is arranged. Another seat belt guide member 49 is arranged on frame member 29 so as to from a pair with member 45. As can be seen the seat belt forms an open loop while being slung along said members 45, 48 and 49. As the frame members 27a, 29 are construed and arranged to move said central intermediate guide member away from said pair upon motion to the crash position the path for the seat belt is lengthened effectively. In addition a significant retardation effect is caused by this open loop arrangement.

In the design of FIGS. 3, 4 the lower end of extension 27a is linked via a linkage arm 36 to the frame member 23 having pivot connectors at both ends of the arm 36.

In FIGS. 5, 6 seat 100 again includes many parts already discussed in detail. The frame member 23 now is designed to extend up to the upper backrest frame member 25 and engage in a slidable manner therewith at its upper end at 101) as can be seen in the figures.

Also the seat cushion frame member 21 is now arranged to slide forward with respect to the supporting frame member 23 upon motion to the crash position.

Figure 7:
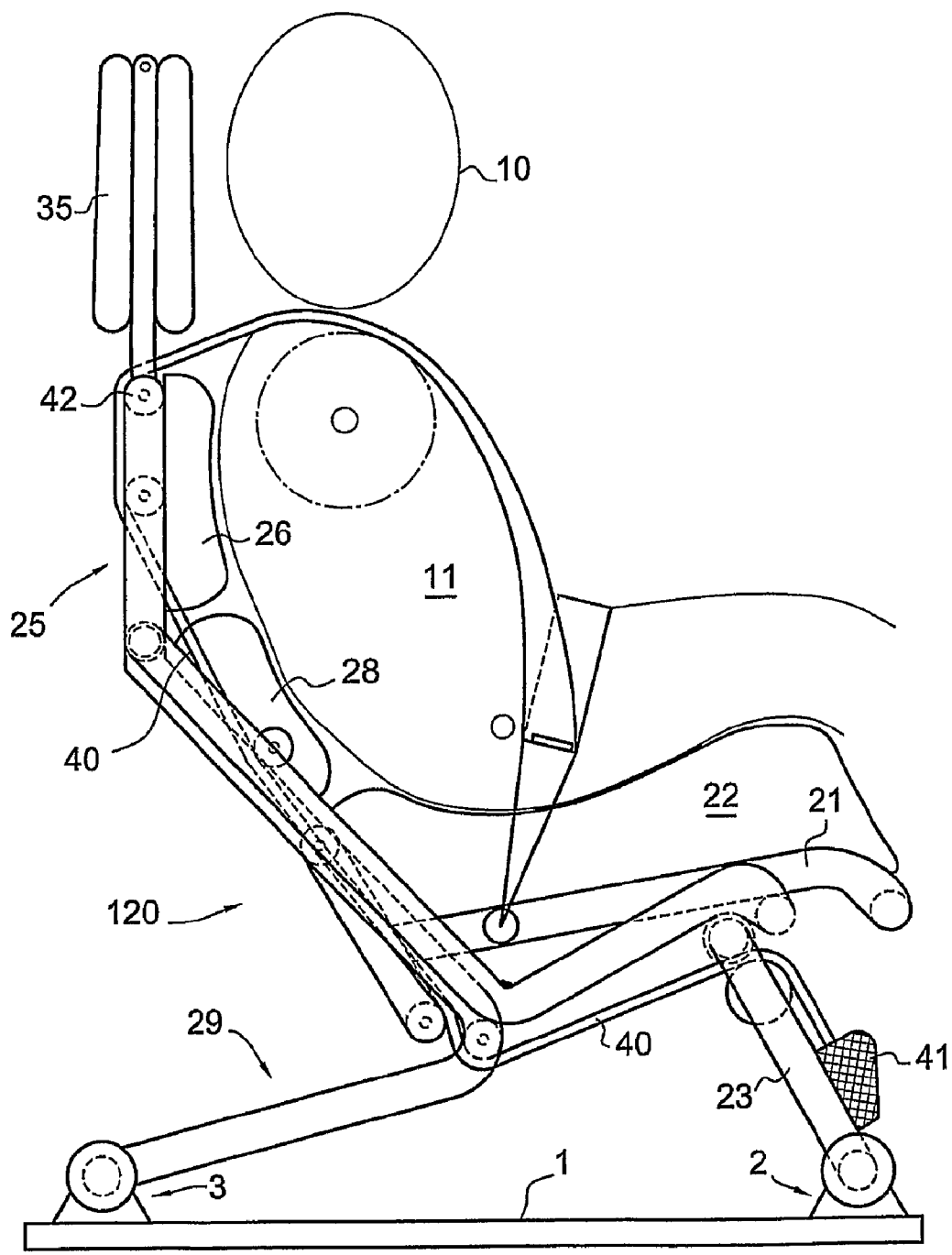
FIG. 7 shows diagrammatically a fourth example of a seat according to the invention when in normal position, FIG. 8 the seat of FIG. 7 in crash position.
Figure 8:
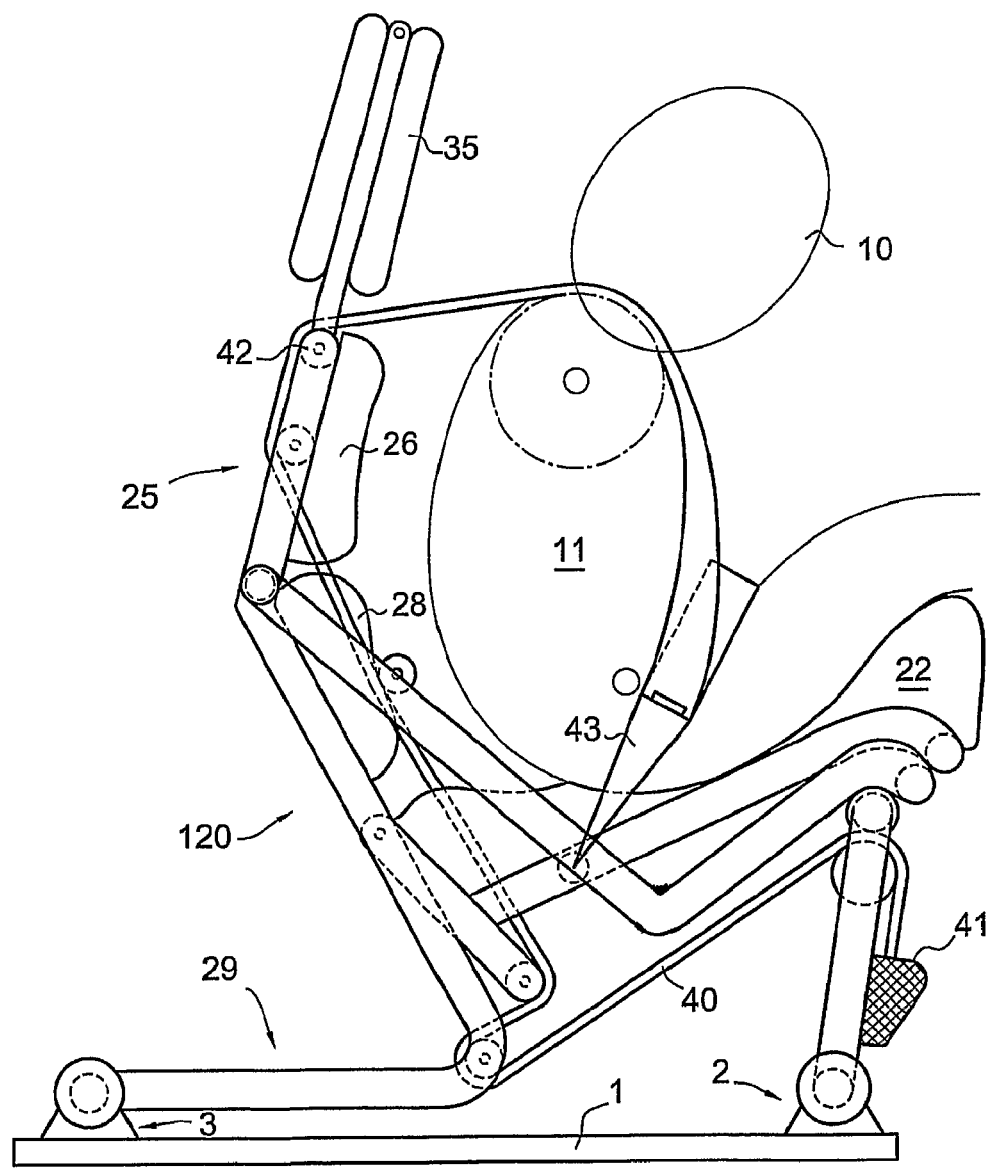

FIGS. 7, 8 show seat 120 the lower and upper backrest cushion both being arranged on member 29/25.

Figure 9:
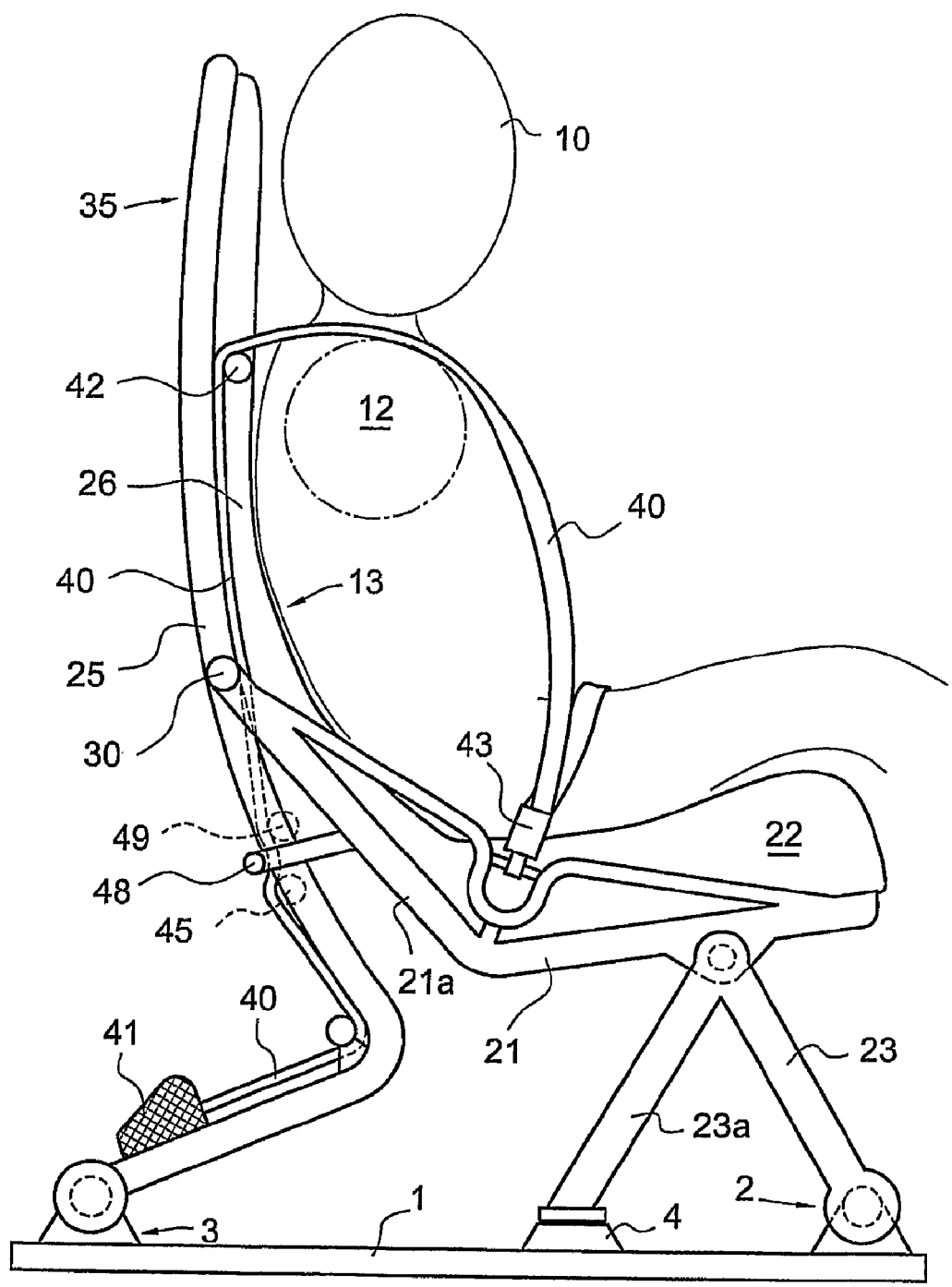
FIG. 9 shows diagrammatically a fifth example of a seat according to the invention when in normal position.

In FIG. 9 the seat cushion frame member 21 is a monolithic structure having a lower portion 21b which extends below the seat cushion 22 and a raised rear portion 21a which extends behind the occupants lower back. As is preferred side frame members 21b of the frame member 21 extend on either side of the seat cushion and are fitted to the lower and raised rear portion of the frame member 21 for increased stability (and also providing side impact resistance).

By a monolithic and essentially undeformable cushion frame member 21 extending below the seat cushion and also in the area behind the lower back of the occupant the effect is obtained that no "motion" takes place of parts of the seat frame structure in this region. This avoids "pinching" of the occupants body in this area and thereby reduces loads on the body in this area upon a collision. Also it is found that this is practical in design and allows for a low mass of the seat.

As can be seen, and is preferred, the seat belt lock member 43 is attached to this frame member 21.

The cushion frame member 21 is at a relative high location (at 30) connected to backrest frame assembly 25. Locating this pivotal connection high up, preferably above the upper surface of the seat cushion, has positive effects, such as the increase stability of the backrest frame member when loaded by the seat belt, in turn allowing for weight reduction of the backrest frame member.

As can be seen the seat belt retractor 41 here is mounted on the backrest frame assembly member.

It will be appreciated that the pivotal connector 3 is here located rearward from the backrest frame. Such a location of the pivot point can be advantageous, but the rearward extension of the lower portion of this frame could be considered problematic (e.g. a in bus for passengers sitting on the seats in a row further behind). The skilled person will appreciate that other pivotal connectors, e.g. multi-link connectors, can simulate an imaginary pivot point located rearward of the backrest frame while the connector itself is located within the vertical projection of the seat.

In the FIG. 9 the frame member 23 of the seat cushion frame assembly is equipped with a support member 23a which, in the normal position of the seat, rests upon the floor or a floor mounted abutment member or stop 4. This creates a stable position of the seat during normal driving.

FIG. 9 also depicts a further option, namely to pass the seat belt 40 between the backrest frame and the backrest cushion. This has the effect that the seat belt is clamped to a certain extend when the occupant sits in the seat and so allows the occupant to arrange the seat belt in a desirable manner without the seat belt retractor undoing said desirable manner. As soon as the occupant leans forward (or is moved forward by inertia) this clamping effect becomes undone and the seat belt refractor becomes active. It is thought that this effect may induce more people to actually use their seat belt.

Figure 10:
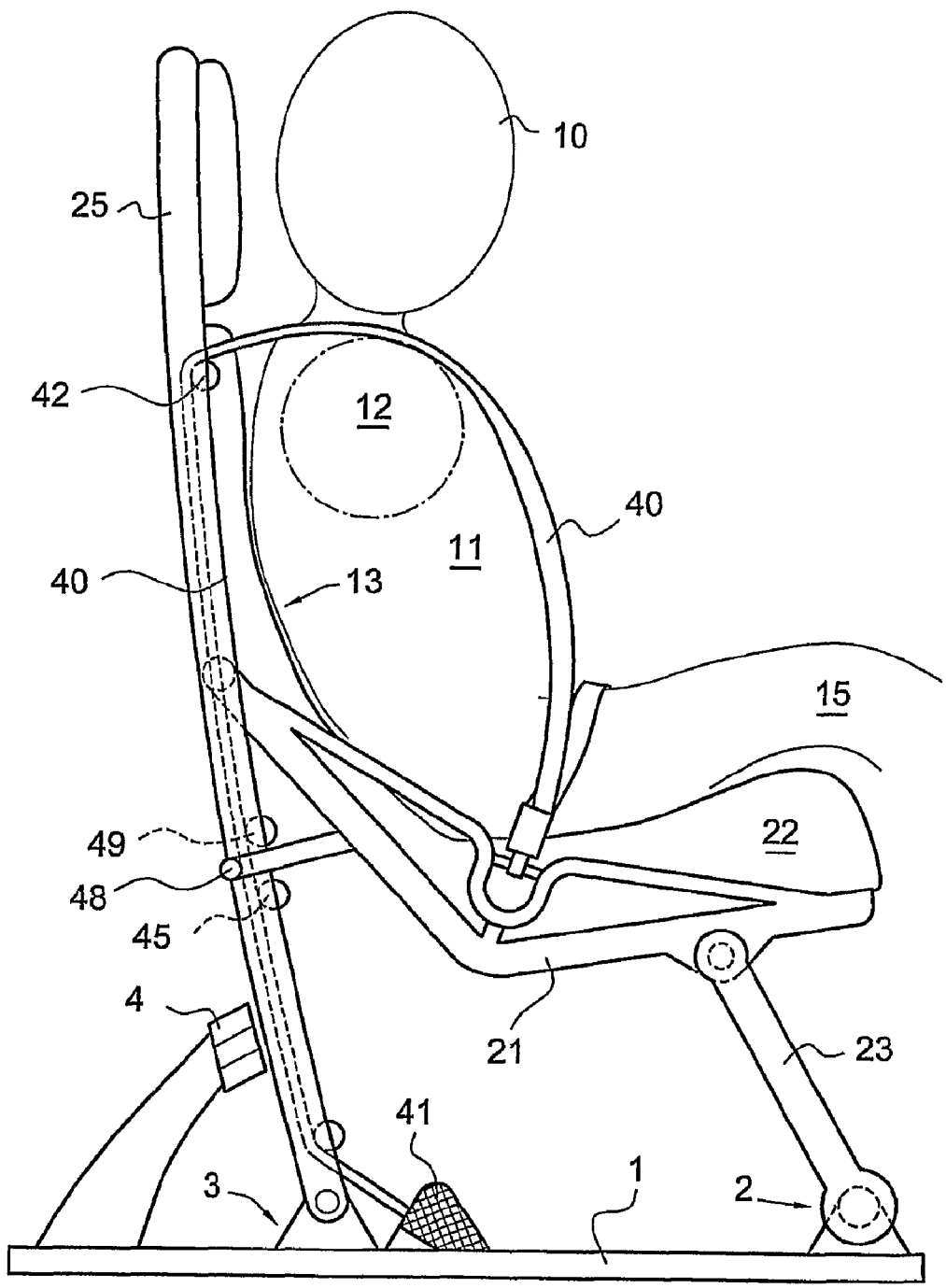
FIG. 10 shows diagrammatically a sixth example of a seat according to the invention when in normal position, FIG. 11 an illustration of an example of the backrest of a seat according to claim 33.

In FIG. 10 the same seat cushion frame member 21 is shown. Here the backrest frame assembly 25 is formed by one monolithic structure of an essentially straight design. The pivotal connector 3 provides a pivot point effectively at the lower end of said assembly 25. The seat belt 40 passes from a seat belt retractor 41 on or located adjacent to backrest frame assembly upwards along said frame assembly to guide 42.

As is preferred the seat belt runs in between intermediate guide members 45, 48, 49 to effect a shortening of the seat belt path as explained above.

The inventive seat allows car designers to achieve many additional advantages. One such advantage lies in the side impact collision. When, as preferred, the seat belt is fully integral with the seat (so all items as retractor, lock and anchoring points being mounted on the seat structure) than sideways displacement of the entire seat has less negative effect of the loads imposed by the seat belt on the passenger than in common situations wherein seat belt shoulder guide and lock member are mounted on the vehicle body.

The inventive seat could include a reclining mechanism for the backrest or part of the backrest when desired.

Arranging the shoulder guide on the seat structure also allows designers to do away with or "slim down" the central pillar of the vehicle body between the front and rear side doors of the vehicle. In known cars this pillar should be designed to absorb the seat belt forces on the shoulder guide mounted on said pillar, which impose severe restrictions on the design thereof.

It is noted here that a three-point seat belt system is preferred, but that obviously a four-point seat belt system or other seat belt system providing an occupant securing effect similar to a three-point seat belt system or even better are within the scope of this application.

As mentioned above the seat could be designed to provide mobility at all times, so without any blocking means as explained above. It is expected that such an unblocked design or a design allowing in a blocked mode a certain limited range of mobility (or when allowing overriding the blocking means by the occupant/vehicle driver) may contribute to counter the effect of carsickness (e.g. of children).

The seat according to the invention could be arranged directly forward of the luggage compartment of a vehicle, the seat effectively delimiting said compartment. This can be highly advantageous as upon a collision the seat will move forward allowing the luggage to follow. This avoids overloading of the seat by the inertia forces of the luggage as is observed in many prior art seats. In this respect it may be advantageous to connect a luggage cover or luggage net (e.g. a fabric or a solid cover) directly to the rear of said seat, so that the cover or net will follow the forward motion of the seat upon collision and no gap exist for luggage to escape behind the rear of the seat.

In a variant the seat is combined with a luggage compartment cover which is normally in horizontal position. It is envisaged to provide a mechanical linkage between the seat and the cover which is adapted to cause an upward pivotal motion of the cover upon collision induced motion of the seat, e.g. to an essentially vertical position. In said way the cover would form a protection against luggage that is catapulted forward over the seats.

Figure 11:
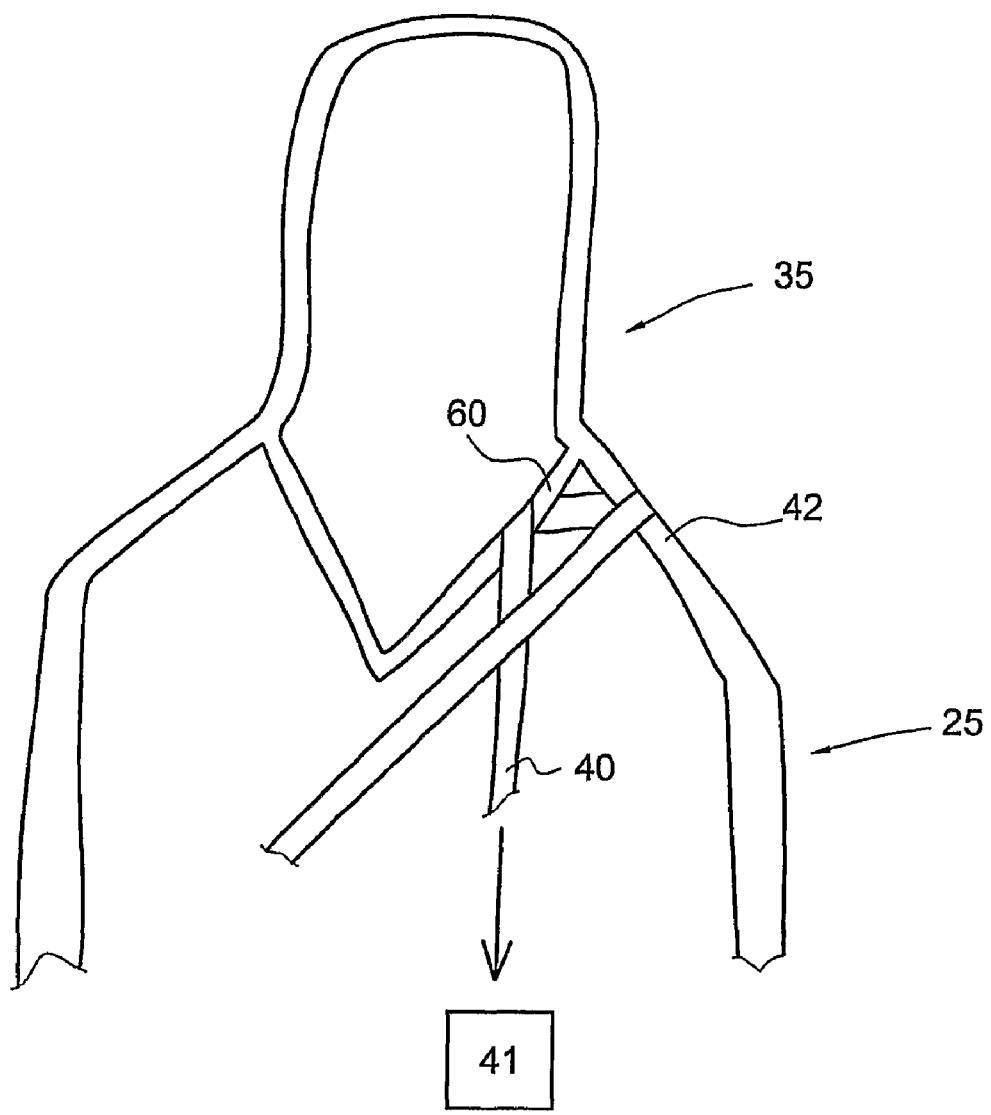

FIG. 11 depicts a second aspect of the invention by way of an example. It is noted that this second aspect may be advantageously integrated in the seat according to the present invention. It however also noted that this second aspect may also be integrated in vehicle seat with a prior art design, such as with a fixed backrest frame (or just with inclining system allowing to set the desired inclination). The figure shows the upper portion of a backrest of a vehicle seat, as well as a seat belt as part of a three-point seat belt system. As is shown here the shoulder guide 42 is part of the backrest frame 25, and in particular the guide is placed at an angle with respect to the horizontal. Also a corresponding "inner seat belt guide 60 is provided, adjacent to the shoulder guide 42 and also a part of the backrest frame 25. In a simple design both guides 42, 60 are formed by tubular elements of the backrest frame. The guide 60 is also placed at an inclined orientation, the angle between the guides 42, 60 being less than 90 degrees.

The seat belt 40 arrives at the guide 60 from below, is then passed from the front of said guide 60 to the back of said guide 60 (over the guide) and then towards the back of the guide 42. Here the seat belt passes over the guide 42 to the front of the backrest frame and then over the torso of the occupant (not shown here).

It is noted that the effective width of the guide 42 is at least twice the width of the seat belt 40.

The inclined orientation of the guide 42 has the effect that the position of the seat belt will automatically adjust to the height of the occupant (in particular the position of the shoulder of the occupant). This effect is very advantages in buses etc, wherein nowadays no provisions are present to adjust the shoulder guide. Also as the shoulder guide includes no moving parts, its design is cheap and incorporation in the backrest simple.

The invention claimed is:

1. A deceleration responsive vehicle seat for an occupant of a vehicle, comprising:

a seat having a frame structure adapted to support the occupant and to absorb the weight of the occupant and other forces exerted by said occupant on the seat, said frame structure including a seat cushion frame assembly, said seat cushion frame assembly comprising a seat cushion frame and a seat cushion being supported by said seat cushion frame, the seat cushion frame assembly supporting a first intermediate seat belt guide member, said frame structure further including a backrest frame assembly, said backrest frame assembly comprising a backrest frame, a backrest cushion being supported by said backrest frame, the backrest frame assembly supporting a second intermediate seat belt guide member, said seat allowing to support said occupant in an upright sitting normal position, said seat further including frame structure fixation means adapted and arranged to fix said frame structure to the vehicle, wherein the frame structure fixation means provide mobile attachment of the seat cushion frame assembly and the backrest frame assembly to the vehicle, and wherein the seat cushion frame assembly and backrest frame assembly are linked to another in a mobile manner, said seat further including a seat belt system with a seat belt for said occupant, which seat belt system includes:

a seat belt having a lap part and a shoulder part, said shoulder part embodied to extend across the front of the occupant, a seat belt retractor engaging on said seat belt shoulder part, a seat belt shoulder guide member mounted on said backrest frame assembly, wherein said seat belt shoulder part passes along said seat belt shoulder guide member to said retractor, wherein the shoulder belt part passes from the retractor along the first and second intermediate seat belt guide members to the shoulder guide member, and wherein said mobile linking of the cushion frame assembly and backrest frame assembly allows for change in mutual spatial orientation of the first and second intermediate seat belt guide members that are respectively supported by the cushion frame assembly and backrest frame assembly upon pre-collision braking or collision induced deceleration with respect to their mutual spatial orientation in a normal driving position of the seat, and wherein said first and second intermediate seat belt guide members are arranged such that said change in mutual spatial orientation upon pre-collision braking or collision induced deceleration causes a lengthening of the path of the seat belt shoulder part between the retractor and the shoulder guide member.

2. The seat according to claim 1, wherein the frame structure fixation means provide attachment of the seat cushion frame assembly to the vehicle and pivotal attachment of the backrest frame assembly to the vehicle, and wherein the seat cushion frame assembly and backrest frame assembly are linked to one another in a mobile manner by one or more pivotal connectors, so that upon pre-collision braking or collision induced deceleration the cushion frame assembly and backrest assembly will pivot with respect to the vehicle and with respect to each other.

3. The seat according to claim 1, wherein said seat further includes blocking means that are construed and arranged to block said seat in its normal position and allow for motion upon pre-collision braking or collision induced deceleration when one or more of the following predetermined conditions are fulfilled, an inertia induced increase of a load on said blocking means above a predetermined load level, or a sensing of the deceleration, said deceleration increasing above a predetermined deceleration, or a sensing of a collision risk, sudden vehicle movement or steering action.

4. The seat according to claim 1, wherein said seat includes an actuator adapted to force said seat into a motion corresponding to said motion resulting from braking or collision induced deceleration upon a command to said actuator.

5. The seat according to claim 1, wherein a third central intermediate seat belt guide member is arranged on one of the backrest frame assembly and seat cushion frame assembly, so as to form an open loop in said seat belt around said first, second and third central intermediate seat belt guide members, said backrest frame assembly and seat cushion frame assembly being construed and arranged to move said third central intermediate seat belt guide member away from said first and second intermediate seat belt guide members upon pre-collision braking or collision induced deceleration thereby lengthening the path for the seat belt shoulder part between the retractor and the shoulder guide member.

6. The seat according to claim 1, wherein said first and second intermediate seat belt guide members each included a curved guide face for the seat belt shoulder part mounted stationary on the respective frame assembly so as to frictionally guide the seat belt there along when contacted by said seat belt.

7. The seat according to claim 1, wherein the retractor is mounted on said seat cushion frame assembly.

8. The seat according to claim 7, wherein the retractor is mounted on a pivotal frame member of the seat cushion assembly.

9. The seat according to claim 8, wherein said pivotal frame member of the seat cushion assembly is at its upper end pivotally connected to the seat cushion frame member upon which the seat cushion is supported.

10. The seat according to claim 1, wherein the fixation means comprises a forward fixation member, essentially fixing said seat cushion frame assembly to the vehicle, and a rearward fixation member, essentially fixing said backrest frame assembly to said vehicle;

wherein said forward and rearward fixation members are pivotal connectors, said backrest frame assembly and said seat cushion frame assembly each including a pivotal frame member connected to said respective pivotal connector.

11. The seat according to claim 10, wherein the backrest frame assembly includes an upper backrest frame member supporting an upper part of the backrest, and a lower backrest frame member supporting a lower part of the backrest, said upper and lower backrest member being pivotally interconnected, preferably such that upon collision or pre-collision braking induced motion of the seat from said normal position said backrest members include a gradually decreasing angle between them;

wherein the pivotal frame member connected to said rearward pivotal connector is integral with the upper backrest frame member, such that upon motion to said crash position said upper backrest frame member pivots about said pivotal connector.

12. The seat according to claim 11, wherein the lower backrest frame member is at is lower end pivotally connected to a rear portion of the seat cushion frame member.

13. The seat according to claim 1, wherein said seat belt system includes an anchoring member attached to the seat cushion frame assembly at one side thereof and securing an end of the seat belt and a lock member are attached to seat cushion frame assembly at an opposite side thereof so as to have a lap belt portion between said anchoring member and lock member.

14. The seat according to claim 1, wherein seat allows for a lengthening of the path of the seat belt shoulder part between the retractor and the shoulder guide member upon pre-collision braking or collision induced deceleration of between 10 and 50 centimetres.

* * * * *